3,397,049
METHOD OF CONTROLLING MESQUITE

Robert H. Beatty, Philadelphia, Pa., assignor to Amchem Products, Inc., Ambler, Pa., a corporation of Delaware
No Drawing. Filed Apr. 26, 1965, Ser. No. 451,056
3 Claims. (Cl. 71—84)

ABSTRACT OF THE DISCLOSURE

The herbicidal composition and method for treating mesquite plants including a 2,4,5-trichlorophenoxyacetic acid compound and a thiocyanate salt.

---

This invention relates to a process for controlling the growth of mesquite and a herbicidal composition for use in connection therewith.

Mesquite (*Prosopis juliflora var. glandulosa*) represents the largest, single, perennial brush problem which exists today in the United States southwest rangeland country. Mesquite infestation into rangelands has continually increased over the past few years until today as much as 50 million acres of grassland is now infested in the State of Texas alone. It has been estimated by soil conservation investigations that mesquite infestation has increased by over one million acres in Texas in the past fifteen years, and this notwithstanding the use of various herbicidal agents for purposes of eradictating or controlling this particular noxious species.

Many herbicidal agents have been employed in attempts to eradicate or to control mesquite, including conventional herbicidal agents such as, for example, the phenoxyalkanoic acids, typical of which is 2,4,5-trichlorophenoxyacetic acid and functional derivatives thereof. However, while some regrowth retardation is achieved using such herbicidal agents, no known herbicide has as yet succeeded in eradicating this undesirable plant species when employed at economic dosage rates. A desirable and tolerable level of mesquite control is one which would provide ground-line kill thereby controlling the rate of growth of basal sprouts which originate at the ground-line following herbicide application. Regrowth rates from mesquite plants which have been subjected to treatment with herbicides are appreciably faster and more vigorous than are normal growth rates for seedling mesquite. Accordingly, herbicide applications must be made at more frequent intervals, relative to the previously treated and established plants than to seedling plants.

Thus the need exists for an effective herbicide which will destroy mesquite and thereby retard the regrowth rate of treated plants so that such regrowth will be approximately equal to or at slower growth rates than seedling mesquite plants.

With the foregoing in mind the principal object of the present invention is the provision of an effective and economical process for the control of mesquite regrowth in rangeland areas.

The present invention is based upon the surprising discovery that if thiocyanate ion is applied to mesquite plants at a rate of from $\frac{1}{40}$ to 1 lb./acre, and if there is also applied to such area of mesquite infestation from $\frac{1}{3}$ to 1 lb./acre of a 2,4,5-trichlorophenoxyacetic acid compound, there will result a high degree of control over mesquite regrowth.

The rate of application of the thiocyanate ion is critical and must be within the range of $\frac{1}{40}$ to 1 lb./acre. Where less than $\frac{1}{40}$ lb. of the thiocyanate ion is applied to the area of mesquite infestation it will be found that no enhanced activity will be realized, beyond what would have been obtained if conventional herbicidal agents had been used alone. Conversely, if more than 1 lb./acre of the thiocyanate ion is applied in conjunction with from $\frac{1}{6}$ to 1 lb./acre of 2,4,5-trichlorophenoxyacetic acid the rate of control in regrowth of the undesirable mesquite plants will not be found to be enhanced over the values obtained from the use of the herbicide acid alone, notwithstanding the use of even higher amounts of the thiocyanate component.

The thiocyanate ion is preferably employed in the form of an alkali metal or ammonium salt, such as for example the sodium, potassium, lithium or ammonium salt thereof. These salts are sufficiently water soluble so as to permit the formulation of spray solutions containing the desired amount of dissolved thiocyanate component.

With respect to the 2,4-5-trichlorophenoxyacetic acid compound it has been found that this may be either the acid or a functional derivative thereof, such as for example an alkali metal, ammonium or substituted ammonium salt or an ester. A particularly preferred form of introducing the 2,4,5-trichlorophenoxyacetic acid compound is as the butoxy ethanol ester, since this latter derivative possesses excellent properties with respect to oil solubility and forms a readily prepared herbicidal formulation in conjunction with an aqueous solution of the thiocyanate ion.

Whichever form of the required 2,4,5-trichlorophenoxyacetic acid compound is employed, however, it is essential that the acid equivalent which is applied to each acre of mesquite infestation be such that from $\frac{1}{3}$ to 1 lb./acre of the acid is actually utilized. If less than $\frac{1}{3}$ lb./acre of acid equivalent is employed, it will be found that no substantial regrowth control over the mesquite plants will be realized. Conversely, if more than 1 lb./acre of 2,4,5-trichlorophenoxyacetic acid equivalent is utilized, it will be found that the enhanced activity derived from the combination of the acid compound with the critical amount of thiocyanate ion will not be realized, and the results obtained will be similar to those which would have been obtained had the herbicidal acid been employed alone.

So far as concerns application of the herbicide acid compound and the thiocyanate ion, it is not essential that both be applied simultaneously to the mesquite plants. It has been found that, if desired, the thiocyanate compound may first be applied to the area of infestation followed by an application of the herbicide acid compound. In the interest of economy, however, and to prevent duplication of operations, it is preferred to employ a solution or a formulation containing both of the active components and simultaneously to apply such formulations over the area to be controlled.

It is, however, to be understood that either a herbicidal acid compound or the thiocyanate ion may be initially applied to the mesquite plants and then the other component applied thereto within the course of an hour or two thereafter with the particular order of application generally not being of significance.

In order to illustrate the surprising effects flowing from the present invention there are presented below a series of results which were obtained on experimental test areas in heavily infested mesquite rangeland of the Southwest. These results are presented herewith solely by way of illustration and are not intended in any way to be construed as a limitation of this invention.

EXAMPLE I

An aqueous solution of $NH_4SCN$ was applied, during the growing season, to an area heavily infested with mesquite, at rates varying from $\frac{1}{10}$ to 6 lbs. of the thiocyanate ion/acre. Immediately thereafter, an oil solution of the butyoxyethanol ester of 2,4,5-trichlorophenoxyacetic acid was applied at a rate of $\frac{1}{2}$ lb. of the active acid equivalent per acre. It is preferred that both the thiocyanate component and herbicidal acid compound be formulated in a carrier in the proportion of approximately 1 to 3 pounds of active ingredient per gallon of carrier. The various components can be readily mixed together at room temperature and with ordinary stirring. Results of these treatments were observed 15 months following spray applications and are reported below in Table 1.

TABLE 1

| Lbs./acre SCN (as NH$_4$ salt) | Percent reduction in sprout height | Percent defoliation of mesquite |
|---|---|---|
| None | None | 79 |
| 1/10 | 13 | 91 |
| 1/5 | 16 | 99 |
| 1/2 | 12 | 88 |
| 1 | 30 | 82 |
| 2 | None | 66 |
| 6 | None | 50 |

The remarkably surprising drop-off in effect at levels above 1 lb./acre of the thiocyanate ion is clearly demonstrated by these results. Use of treatments of 1/10 and of 1 lb./acre of thiocyanate alone had no measurable effect on mesquite growth.

EXAMPLE II

An aqueous solution of sodium thiocyanate was applied to an area heavily infested with mesquite, and which had been treated with 2/3 lb./acre of 2,4,5-trichlorophenoxyacetic acid supplied as the butoxyethanol ester. Application of both the herbicide ester and the thiocyanate compound were, after formulation as set forth in Example I, made during the growing season, and observations of the effects of these treatments, were made 15 months after treatment and are recorded below in Table 2.

TABLE 2

| Lbs./acre SCN⁻ (as Na SCN) | Percent reduction in sprout height | Percent defoliation of mesquite |
|---|---|---|
| None | None | 76 |
| 1/40 | 33.5 | 98 |
| 1/10 | 19 | 93 |
| 2 | None | 67 |

Results of Table 2 show that maximum effect was realized when only 1/40 lb./acre of thiocyanate was combined with 2/3 lb./acre of 2,4,5-trichlorophenoxyacetic acid supplied as the butoxyethanol ester. Use of less than 1/40 lb., or of 2 lbs./acre, of thiocyanate alone had no noticeable effect on mesquite plants.

EXAMPLE III

An application of 1/3 lb./acre of 2,4,5-trichlorophenoxyacetic acid, applied as an acid emulsion plus 1/40 lb. of thiocyanate ion, supplied as the lithium salt, resulted in 24% reduction in mesquite sprout height regrowth 15 months after spray application as compared to plants treated with the herbicide ester alone, and in 91% defoliation of mesquite as compared to 76% defoliation when the herbicide ester was used alone. Use of 1/40 lb./acre of thiocyanate ion alone, had no observable effect on mesquite plants.

EXAMPLE IV

Utilization of from 1/40 to 1 lb./acre of thiocyanate ion, supplied as the ammonium salt, in conjunction with the application of 1/2 lb./acre of 2,4,5-trichlorophenoxyacetic acid, supplied as the triethylamine salt, resulted in from 15 to 23% reduction in the height of mesquite sprout regrowth 16 months after spray application, as compared with mesquite plants treated alone with 1/2 lb. of the herbicide ester, and in up to 93% defoliation of mesquite as compared to 76% defoliation when 1/2 lb. of the herbicide ester was utilized alone. Use of 1/40 lb. or of 1 lb./acre of thiocyanate ion alone had no observable effects upon the treated plants.

The foregoing results clearly demonstrate the surprising and unexpected results obtained by the process of the present invention.

The various formulations of Examples III and IV were prepared as set forth in connection with Example I. Where the thiocyanate ion and herbicidal acid are applied simultaneously together as components of a single formulation, such formulation is simply prepared by combining the various ingredients at room temperature. The formulations are applied by conventional spraying equipment.

The results obtained through the utilization of the present invention are significant because the prior attempts using the herbicidal acid alone actually tended to promote the growth of the mesquite basal sprouts. This is because the defoliation achieved by the herbicidal acid alone does not result in the destruction of mesquite, but instead accelerates the growth of the basal sprouts at the ground-line. Thus, the use of herbicidal acids alone not only maintains the unusable state of the ground but also promotes the spread of mesquite to fertile areas. The utilization of the present invention has had the effect of preventing further growth of the noxious mesquite.

Obviously, many modifications and variations of the present invention are possible in the light of the above teachings. It is therefore to be understood that within the scope of the appended claims the invention may be practiced otherwise than as specifically described.

I claim:

1. A method of herbicidally controlling mesquite plants comprising applying to said plants the following:
   (a) 2,4,5-trichlorophenoxyacetic acid compound,
   (b) thiocyanate ion in the form of a salt combined with a cation selected from the group consisting of ammonium, lithium, sodium and potassium,
said 2,4,5-trichlorophenoxyacetic acid being present in an amount such that it will be applied at the rate of from 1/3 to 1 lb. of acid equivalent, and wherein said thiocyanate ion is present in an amount such that it will be applied at a rate of from 1/40 to 1 lb. per acre of effective component.

2. The method of claim 1 wherein said herbicidal acid equivalent is a butoxyethanol ester of 2,4,5-trichlorophenoxyacetic acid.

3. The method of claim 1 wherein said thiocyanate ion and said acid are applied simultaneously.

References Cited

UNITED STATES PATENTS 2,390,941 12/1945 Jones _____ 71—2.6
2,674,623  4/1954 Orloff et al. _____ 71—2.6 XR
3,278,291 10/1966 Evans _____ 71—2.3
2,557,618  6/1951 Stull _____ 71—109

OTHER REFERENCES

Hitcock et al.: Contrbs. Boyce Thompson Inst., 15 pp., 173–193 (1948), CA 43, p. 805 (1949).

Robison: "Field Response to Varying Combinations of 2,4,5-T and Ammonium Thiocyanate."

Proceedings of the Southern Weed Control Conference, Jan. 1, 1965.

LEWIS GOTTS, *Primary Examiner.*

G. HOLLRAH, *Assistant Examiner.*